(12) United States Patent
Asai et al.

(10) Patent No.: US 7,848,711 B2
(45) Date of Patent: Dec. 7, 2010

(54) RADIO COMMUNICATION APPARATUS AND RADIO COMMUNICATION METHOD

(75) Inventors: Takahiro Asai, Yokosuka (JP); Hui Shi, Yokohama (JP); Hiromasa Fujii, Yokosuka (JP); Takefumi Yamada, Kawasaki (JP); Hitoshi Yoshino, Yokosuka (JP); Hiroshi Suzuki, Tokyo (JP); Kazuhiko Fukawa, Tokyo (JP); Satoshi Suyama, Tokyo (JP)

(73) Assignees: Tokyo Institute of Technology, Tokyo (JP); NTT DoCoMo, Inc., Tokyo (JP)

( * ) Notice: Subject to any disclaimer, the term of this patent is extended or adjusted under 35 U.S.C. 154(b) by 803 days.

(21) Appl. No.: 11/694,124

(22) Filed: Mar. 30, 2007

(65) Prior Publication Data
US 2007/0230547 A1 Oct. 4, 2007

(30) Foreign Application Priority Data
Mar. 31, 2006 (JP) .......................... P2006-098202

(51) Int. Cl.
*H04B 1/50* (2006.01)
*H04B 1/10* (2006.01)

(52) U.S. Cl. .......................... 455/78; 370/278; 370/282

(58) Field of Classification Search ................ 455/296, 455/24, 570, 78, 67.13, 562.1; 370/278, 370/248; 375/219, 144, 364
See application file for complete search history.

(56) References Cited

U.S. PATENT DOCUMENTS

| 5,444,864 A | 8/1995 | Smith |
| 5,691,978 A | 11/1997 | Kenworthy |
| 2001/0050902 A1* | 12/2001 | Asanuma .................... 370/248 |

| 2004/0142700 A1 | 7/2004 | Marinier |
| 2005/0207509 A1 | 9/2005 | Saunders et al. |

FOREIGN PATENT DOCUMENTS

| JP | 9-205332 | 8/1997 |
| JP | 9-247101 | 9/1997 |
| JP | 09312587 A | * 12/1997 |
| JP | 2001007750 A | * 1/2001 |
| WO | WO 96/15596 | 5/1996 |
| WO | WO 2006/023319 A1 | 3/2006 |

OTHER PUBLICATIONS

Hiroshi Suzuki, et al., "Configuration and characteristics of an open space booster device for radio paging systems", 1996 IEIEC Annual Conference, B-428, Mar. 1996, p. 428.

(Continued)

*Primary Examiner*—Matthew D Anderson
*Assistant Examiner*—Gennadiy Tsvey
(74) *Attorney, Agent, or Firm*—Oblon, Spivak, McClelland, Maier & Neustadt, L.L.P.

(57) ABSTRACT

A radio communication apparatus for performing transmission and reception based on radio communication includes: a power suppressor for coupling loop interference signal for attenuating signal power of a received signal to suppress the coupling loop interference signal power of the received signal; and a transceiver having a coupling loop interference signal removal function for analog domain and/or a coupling loop interference signal removal function for digital domain, for removing a coupling loop interference signal contained in a signal output from the power suppressor for coupling loop interference signal.

2 Claims, 15 Drawing Sheets

OTHER PUBLICATIONS

Hiroshi Suzuki, et al., "A Booster Configuration with Adaptive Reduction of Transmitter-Receiver Antenna Coupling for Pager Systems", Proc. of 50$^{th}$ IEEE Vehicular Technology Conference, VTC 1999-Fall, vol. 3, Sep. 1999, pp. 1516-1520.

Koichiro Imamura, et al., "A fundamental study of loop coupling cancellers for broadcast-wave relay in digital terrestrial broadcasting SFN", The Journal of the Institute of Image Information and Television Engineers, vol. 54, No. 11, 2000, pp. 1568-1575.

Hiroyuki Hamazumi, et al., "A Study of a Loop Interference Canceller for the Relay Stations in an SFN for Digital Terrestrial Broadcasting", Global Telecommunications Conference, GLOBECOM'00, IEEE, vol. 1, Nov. 27-Dec. 1, 2000, pp. 167-171.

Toshiyuki Maeyama, et al., "Development of a CDMA repeater comprising an interference wave reducing function", 2002 IEIEC Annual Conference, B-5-62, Mar. 2002, p. 512.

Toshiyuki Maeyama, et al., "Development of Cellular Repeater System with Multiple Radio Echo Suppresser", Personal, Indoor and Mobile Radio Communications, PIMRC 2004, 15$^{th}$ IEEE International Symposium, vol. 4, Sep. 5-8, 2004, pp. 2323-2327.

U.S. Appl. No. 11/774,394, filed Jul. 6, 2007, Shirakabe, et al.

U.S. Appl. No. 11/752,714, filed May 23, 2007, Asai, et al.

* cited by examiner

RADIO COMMUNICATION APPARATUS AND RADIO COMMUNICATION METHOD

BACKGROUND OF THE INVENTION

1. Field of the Invention

The present invention relates to a radio communication apparatus and a radio communication method in which transmission and reception are simultaneously performed using the same carrier frequency.

2. Related Background Art

While different time-based allocation (time slots) for transmission and reception are employed to prevent jamming in TDD systems used for conventional radio communication in which the same RF (Radio Frequency) carrier frequency is used for transmission and reception, US Laid-open Gazette Patent Application No. 2004/0142700 discloses a method in which, with an object of improving frequency utilization efficiency, the transmission and reception are simultaneously performed in the same time slot.

In this method, interference occurs due to imperfections in a circulator which results in signals from a transmission RF signal processor leaking into a received RF signal processor. Further interference is caused by the effects of reflection and diffraction and so on of the propagation path that result in the transmitted signal transmitted from an antenna being received by the same antenna. These interferences are referred to as "coupling loop interference". Employment of a signal consisting of the coupling loop interference signal described above overlaid on a desired signal transmitted from one radio communication apparatus to another radio communication apparatus requires that the desired signal be detected by the receiving radio communication apparatus, however if the coupling loop interference signal power is large the desired signal cannot be accurately detected. Notably, the effect of coupling loop interference attributable to imperfections of the circulator is comparatively much worse than the effect of coupling loop interference caused by a signal being received again once it has been transmitted from the antenna.

With this in mind, US Laid-open Gazette Patent Application No. 2004/0142700 discloses a method of interference removal in a baseband digital domain employing a radio communication apparatus with a coupling loop interference signal removal function.

In addition, another radio communication apparatus able to be used to remove these interferences is a radio communication apparatus with a coupling loop interference signal removal function described as a booster. The cited references "Suzuki, Ebine, "Configuration and characteristics of an open space booster device for radio paging systems", 1996 IEIEC Annual Conference, B-428, pp. 428, March 1996" (hereinafter referred to as "cited reference 1") and "H. Suzuki, K. Itoh, Y. Ebine, M. Sato, "A booster configuration with adaptive reduction of transmitter-receiver antenna coupling for pager systems", Proc. of 50th IEEE Vehicular Technology Conference, VTC 1999-Fall, vol. 3, pp. 1516-1520, September 1999" (hereinafter referred to as "cited reference 2") describe boosters for radio paging systems notable in that interference removal in an RF band which constitutes the analog domain and interference removal in the baseband band which constitutes the digital domain are simultaneously performed. In addition, the cited reference "Imamura, Hamasumi, Shibuya, Sasaki, "A fundamental study of loop coupling cancellers for broadcast-wave relay in digital terrestrial broadcasting SFN", The Journal of the Institute of Image Information and Television Engineers, vol. 54, No. 11, pp. 1568-1575, 2000" (hereinafter referred to as "cited reference 3") describes a booster for digital terrestrial broadcasting that performs interference removal at the IF band or baseband band. Furthermore, the cited reference "Maeyama, Inoue, Kamimura, Yamato, "Development of a CDMA repeater comprising an interference wave reducing function", 2002 IEIEC Annual Conference, B-5-62, pp. 512, March 2002" (hereinafter referred to as "cited reference 4"), describes a CDMA signal booster that performs interference cancellation only at the RF band.

However, the following problems are inherent to the radio communication apparatus of the conventional art described above. That is to say, in the conventional radio communication apparatus described above an analog domain signal consisting of a coupling loop interference signal overlaid on a desired signal intended for reception is processed by a received RF signal processor of a radio communication apparatus with a coupling loop interference signal removal function. Because of the limit value on the magnitude of the input power for correct operation of each of the received RF signal processors of a signal amplifier, filterer and frequency converter (down converter), when the coupling loop interference signal power is significantly larger than the desired signal power, the input power exceeds the limit value and a saturation of the signal occurs. As a result, a marked deformation of the signal wave shape occurs in the signal amplifier, filter and frequency converter in the received RF signal processors. At this time, the greater the magnitude of the input power with respect to the limit value, the greater the signal saturation effect and the greater the deformation of the signal wave shape.

In addition, while as disclosed in cited reference 1 and cited reference 2 noted above, the signal saturation effect at the received RF signal processors can be reduced by removing the interference in the analog domain prior to the signal being received by the received RF signal processors, in this case as well, because of the limit value of the magnitude of the input power for correct operation of the interference remover in the analog domain, signal saturation occurs when a signal in which the limit value is exceeded is input into the interference remover of the analog domain. When deformation of the signal wave shape occurs due to the signal saturation effect in this way, the interference removal characteristics produced by the interference removal performed at the analog domain which constitutes the RF band and the digital domain which constitutes the baseband band are insufficient and, accordingly, a marked deterioration in the detected characteristics of the desired signal occurs.

SUMMARY OF THE INVENTION

With the foregoing in view, it is an object of the present invention to provide a radio communication apparatus and radio communication method that facilitates a reduction of the signal saturation effect in a radio communication apparatus in which transmission and reception are simultaneously performed using the same carrier frequency.

The radio communication apparatus pertaining to the present invention for resolving the problems described above constitutes a radio communication apparatus for performing transmission and reception based on radio communication including: a power suppressor for coupling loop interference signal for attenuating signal power of a received signal in order to suppress coupling loop interference signal power of the received signal; and a transceiver having a coupling loop interference signal removal function for analog domain and/or a coupling loop interference signal removal function for digital domain, for removing a coupling loop interference signal contained in a signal output from the power suppressor for coupling loop interference signal.

According to this configuration, by attenuation of the power of a signal consisting of a coupling loop interference signal overlaid on a desired signal by the power suppressor for coupling loop interference signal, the signal saturation effect can be reduced by the transceiver. In addition, if an adaptive interference canceller in the analog domain, for example, is employed by the transceiver, this adaptive interference canceller can reduce the signal saturation effect.

In addition, the transceiver of the radio communication apparatus pertaining to the present invention includes a baseband signal processor having a transmission baseband signal processor and a received baseband signal processor, and the baseband signal processor is desirably configured so that output from the transmission baseband signal processor is input into the received baseband signal processor. That is to say, the transmission baseband signal processor generates a transmit signal using data input from the received baseband signal processor. As a result, the radio communication apparatus pertaining to the present invention can be employed as a booster in a TDD system, and the signal saturation effect caused by the coupling loop interference signal can be reduced.

In addition, the transceiver of the radio communication apparatus pertaining to the present invention further includes a transmission RF signal processor and a received RF signal processor, and the radio communication apparatus further includes a controller for power suppression for controlling at least one of the magnitude of the signal power attenuated by the power suppressor for coupling loop interference signal, the magnitude of the output power of the transmission RF signal processor, the magnitude of the output power of the received RF signal processor, and the magnitude of the output of the baseband signal processor, the controller for power suppression is desirably configured to perform the control in response to at least one of the magnitude of the output power of the transmission RF signal processor, the magnitude of the output power of the received RF signal processor, and the magnitude of the output of the baseband signal processor. According to this configuration, the signal saturation effect can be further reduced because the magnitudes of output are controllable in response to permissible outputs which differ for each of the transmission RF signal processor, the received RF signal processor and the baseband signal processor.

In addition, the radio communication apparatus pertaining to the present invention further includes a fluctuation determiner for received signal power for determining received signal power fluctuation speed employing an output signal on which analog domain interference removal has been performed by the transceiver, a power determiner for residual interference signal for determining the ratio of residual interference signal power in the output signal power on which digital domain interference removal has been performed by the transceiver, and a transmission propriety/impropriety decider for determining the propriety of transmission from the transmission baseband signal processor in accordance with at least one of whether or not the received signal power fluctuation speed determined by the fluctuation determiner for received signal power is equal to or greater than a predetermined standard value and whether or not the ratio of residual interference signal power determined by the power determiner for residual interference signal is equal to or greater than a predetermined standard value, and wherein the transmission baseband signal processor is desirably configured to perform a signal transmission execution/stoppage control in response to the transmission propriety result decided by the transmission propriety/impropriety decider. According to this configuration, signal transmission propriety can be determined in response to at least one of the fluctuation speed of the received signal power or the ratio of the residual interference signal power. For this reason, when the signal saturation effect is too large and sufficient interference removal characteristics cannot be produced, transmission is determined as being improper and signal transmission can be stopped. Deterioration of the signal detected characteristics of the desired signal can be prevented in this way.

The radio communication method pertaining to the present invention for resolving the problems described above constitutes a radio communication method of a radio communication apparatus for performing transmission and reception based on radio communication including: a power suppression step of attenuating signal power of a received signal to suppress the coupling loop interference signal power of the received signal; and a removing step of performing a coupling loop interference signal removal processing for analog domain and/or coupling loop interference signal removal processing for digital domain, to remove a coupling loop interference signal contained in an output signal by the power suppression step. As a result, by attenuation of the power of a signal consisting of a coupling loop interference signal overlaid on a desired signal, the signal saturation effect can be reduced.

In addition, the radio communication method pertaining to the present invention further includes: a control step of performing control on at least one of the magnitude of the signal power attenuated in the power suppression step, the magnitude of the output power by transmission RF signal processing in the removing step, the magnitude of the output power by received RF signal processing in the removing step, and the magnitude of the output by baseband signal processing in the removing step, and wherein the control is performed in response to at least one of the magnitude of the output power by the transmission RF signal processing, the magnitude of the output power by the received RF signal processing, and the magnitude of the output by the baseband signal processing. As a result, the signal saturation effect can be further reduced because the magnitudes of output are controllable in response to permissible outputs which differ for each of the transmission RF signal processor, the received RF signal processor and the baseband signal processor.

According to the radio communication apparatus and the radio communication method pertaining to the present invention as described above, the signal saturation effect in radio communication in which transmission and reception are simultaneously performed using the same carrier frequency can be reduced.

DESCRIPTION OF THE PREFERRED EMBODIMENTS

The radio communication apparatus pertaining to an embodiment of the present invention will be hereinafter described with reference to the drawings. Where possible, identical symbols have been assigned to identical sections and a replication of the description thereof has been omitted.

First Embodiment

Figure 1:
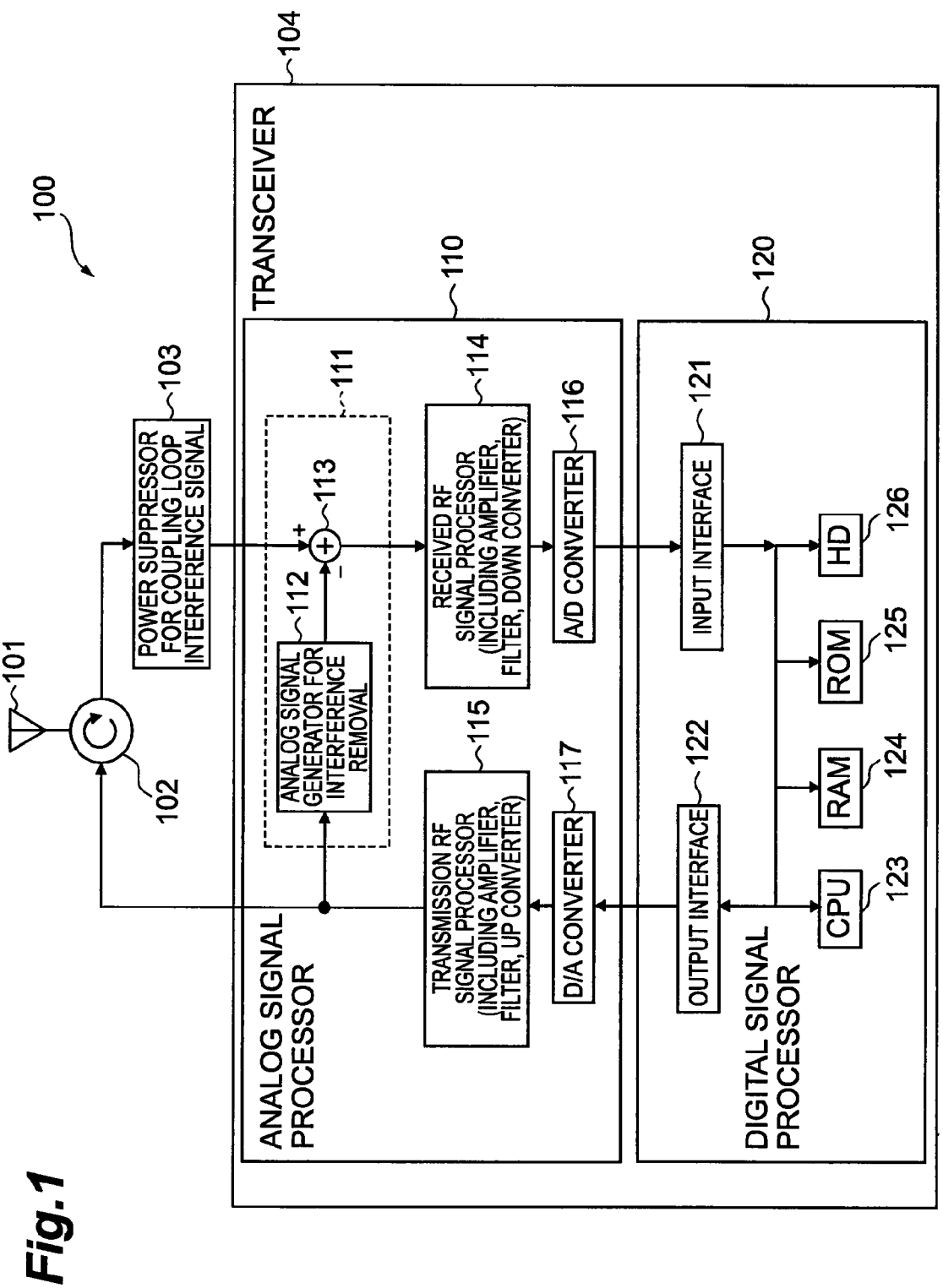
FIG. 1 is a hardware block diagram of a radio communication apparatus pertaining to a first embodiment.

First, the configuration of a radio communication apparatus pertaining to a first embodiment of the present invention will be described. FIG. 1 is a hardware configuration diagram of this radio communication apparatus. As shown in FIG. 1, the radio communication apparatus 100 is physically configured to include an antenna 101, a circulator 102, a power suppressor for coupling loop interference signal 103, and a transceiver 104 with a coupling loop interference removal function. The transceiver 104 is configured to include an analog signal processor 110 and a digital signal processor 120. The analog signal processor 110 is configured to include an analog domain interference canceller 111, a received RF signal processor 114, a transmission RF signal processor 115, an A/D converter 116 and a D/A converter 117. In addition, the analog domain interference canceller 111 is configured to include an analog signal generator for interference removal 112 and analog domain interference signal remover 113. The digital signal processor 120 is configured to include an input interface 121, an output interface 122, a CPU 123, a RAM 124 and ROM 125 serving as a primary memory, and a secondary memory 126 such as a hard disk or the like.

The power suppressor for coupling loop interference signal 103 of this configuration attenuates the signal power of a signal received by the antenna 101 in order to suppress the coupling loop interference signal power contained in the received signal. In addition, the transceiver 104 with the coupling loop interference removal function removes the coupling loop interference signal contained in the received signal from which the signal power has been attenuated by way of the interference canceller 111. By attenuation of the signal power by the power suppressor for coupling loop interference signal 103 in this way, the signal saturation effect can be subsequently reduced by the interference canceller 111. As a result, the removal characteristics of the analog domain coupling loop interference signal can be improved.

Figure 2:
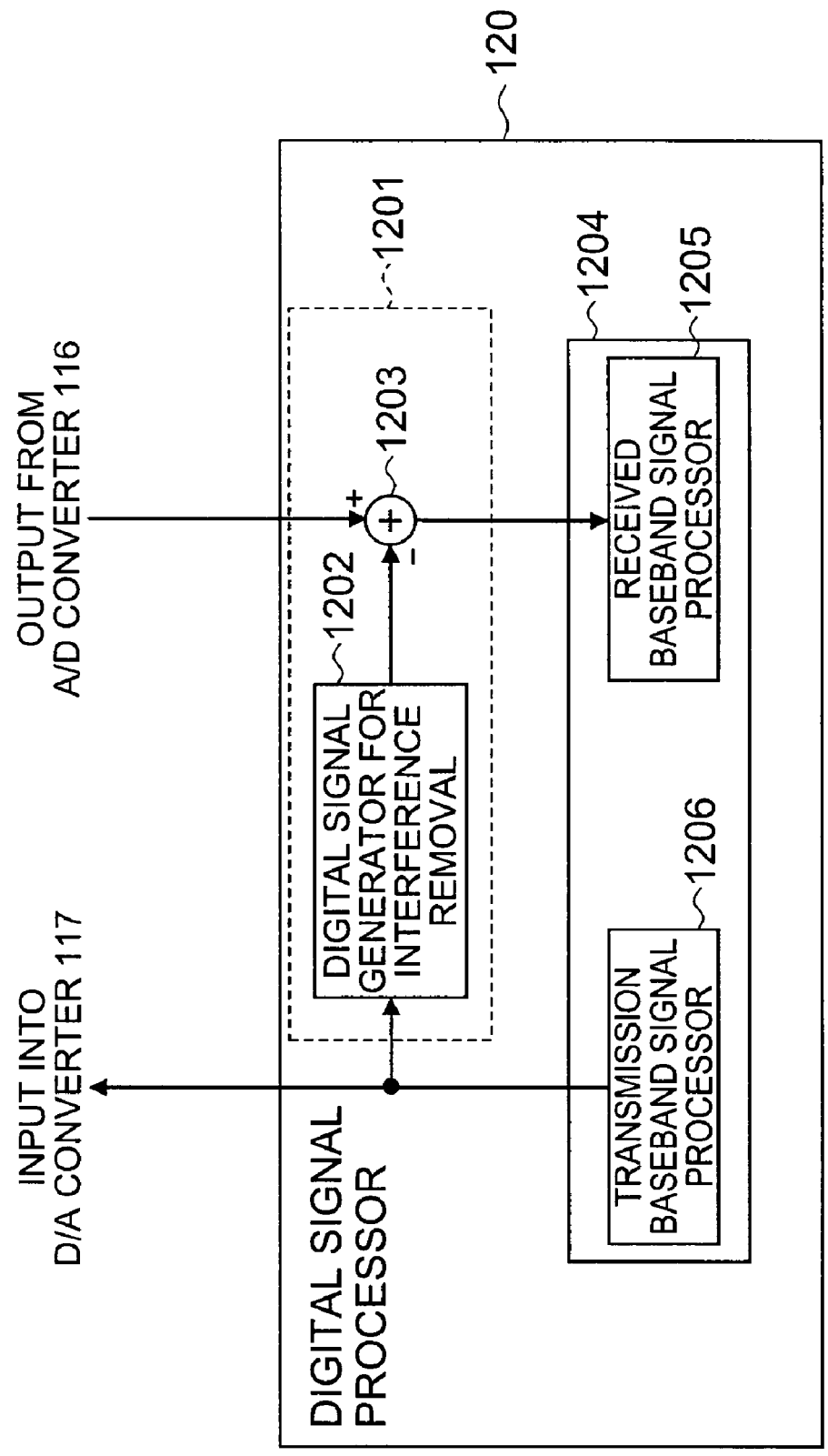
FIG. 2 is a function block diagram of a digital signal processor pertaining to the first embodiment.

FIG. 2 is a function block diagram of the digital signal processor 120 of this embodiment. The digital signal processor 120 is configured to include a digital domain interference canceller 1201 and baseband signal processor 1204. The interference canceller 1201 is configured to include a digital signal generator for interference removal 1202 and an interference signal remover for digital domain 1203. And the baseband signal processor 1204 is configured to include a received baseband signal processor 1205 and a transmission baseband signal processor 1206. The interference canceller 1201 removes the coupling loop interference signal component residually contained in the signal converted into a digital signal by the A/D converter 116. The removal described above is performed by the interference canceller 1201 at this time by deduction of the signal generated by the digital signal generator for interference removal 1202 employing the output signal of the transmission baseband signal processor 1206, from the output signal of the A/D converter 116. While the removal characteristics for coupling loop interference signal differ markedly in the digital domain due to the signal saturation effect in the analog signal processor 110, the removal characteristics of the digital domain coupling loop interference signal can be improved by attenuation of the signal power by the power suppressor for coupling loop interference signal 103.

Figure 3:
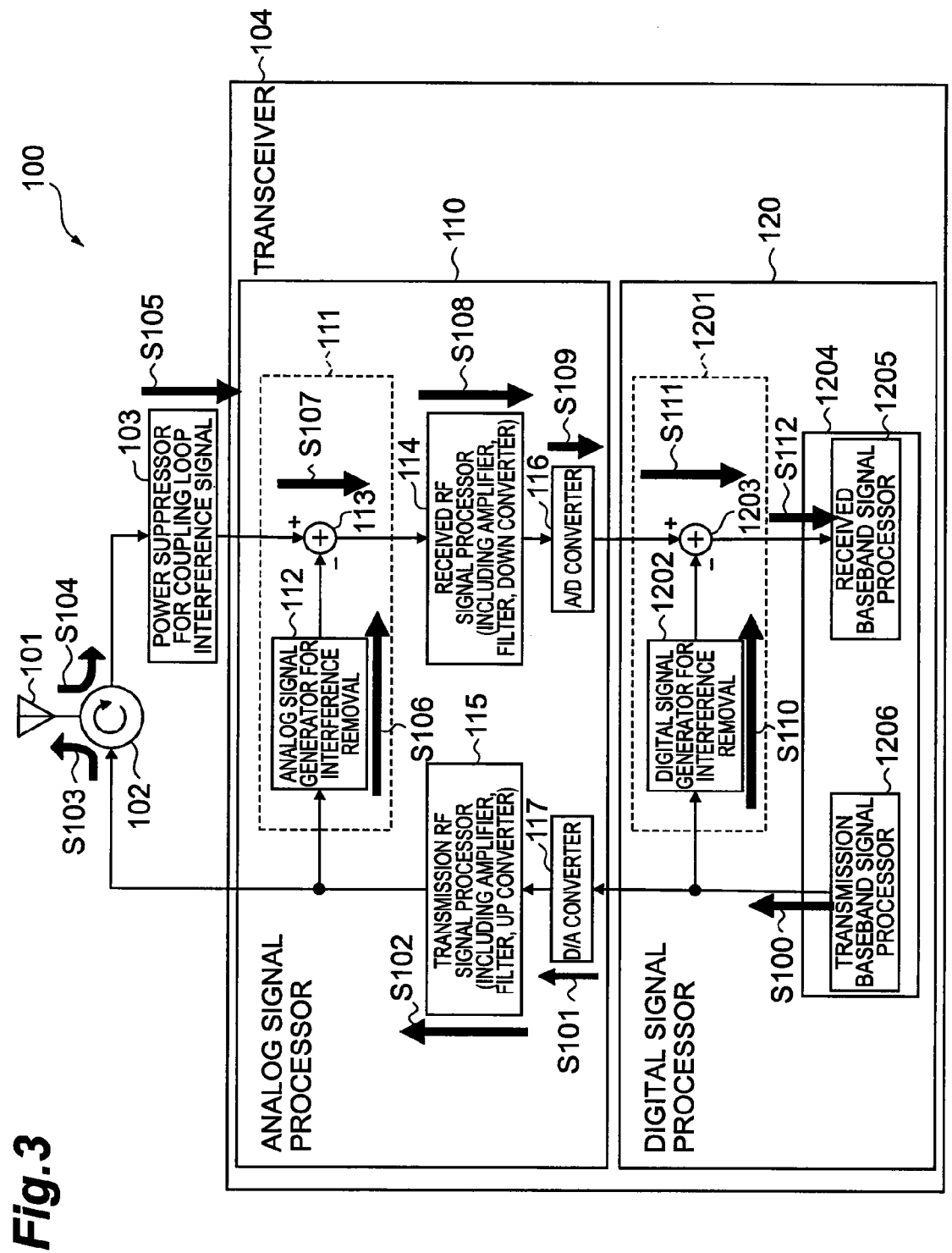
FIG. 3 is a block diagram illustrating an operation protocol of the radio communication apparatus pertaining to the first embodiment.

The operation of the radio communication apparatus and radio communication method pertaining to this embodiment will be hereinafter described. FIG. 3 is a block diagram illustrating an operation protocol of the radio communication apparatus pertaining to this embodiment.

In step S100 of FIG. 3, the transmission baseband signal processor 1206 generates a signal for transmission. The output of the transmission baseband signal processor 1206 is input into the digital signal generator for interference removal 1202 and, in addition, is input into the D/A converter 117. In step S101, the signal input into the D/A converter 117 is converted into an analog signal and input into the transmission RF signal processor 115. Thereafter, in step S102, the signal is converted in the transmission RF signal processor 115 to an RF band analog signal by signal amplification performed by an amplifier, bandwidth limitation performed by a filter, and frequency conversion performed by an up converter, the converted signal being input into the analog signal generator for interference removal 112 and input into the circulator 102. In step S103, the signal input into the circulator 102 is received by way of the antenna 101. Here, due to imperfections in the isolation characteristics of the circulator 102, part of the signal input into the circulator 102 is supplied to the power suppressor for coupling loop interference signal 103 where it forms a coupling loop interference signal. The desired signal transmitted from a radio to the receiving radio 100 and the coupling loop interference signal of the signal transmitted in step S103 are received by the antenna 101 and, in step S104, are supplied to the coupling loop interference signal reducer 103. The power suppressor for coupling loop interference signal 103 attenuates the signal power in step S105 to suppress the signal saturation effect in the analog signal processor 110 and then inputs the signal into the analog domain interference signal remover 113. In step S107, the analog domain interference signal remover 113 performs interference removal employing a signal generated by the analog signal generator for interference removal 112 in step S106. The analog signal generator for interference removal 112 generates an interference removal analog signal employing the output signal of the transmission RF signal processor 115 generated in step S102. The signal on which interference removal has been performed in the analog domain is input into the received RF signal processor 114 whereupon, in step S108, signal amplification by means of an amplifier, bandwidth limitation by means of a filter, and frequency conversion by means of a down converter and so on are performed on the signal in received RF signal processor 114. The signal obtained by the processing of step S108 is input into the A/D converter 116 and, in step S109, is converted into a digital signal by the A/D converter 116, the converted signal being then input into the interference signal remover for digital domain 1203. In step S111, the interference signal remover for digital domain 1203 performs interference removal employing the signal generated by the digital signal generator for interference removal 1202 generated in step S110. Thereupon, the digital signal generator for interference removal 1202 generates a digital domain interference removal signal employing the signal generated by the transmission baseband signal processor 1206 in step S100. In step S112, the signal on which interference removal has been performed by the interference signal remover for digital domain 1203 is input into the received baseband signal processor 1205 where desired signal detection is performed.

By attenuation of the signal power in order to reduce the coupling loop interference signal power in step S105 as described above, the signal saturation effect in the removal of the coupling loop interference signal of the analog domain in step S107 and in the removal of the coupling loop interference signal in the digital domain of step S111 is reduced.

While in the method described above, the signal power is attenuated in the received signal in order to reduce the coupling loop interference signal power when the signal is received, because a relative reduction of coupling loop interference signal power can be produced by increasing the signal transmission of the desired signal, in step S105 the signal transmission of the desired signal may be enlarged.

The effects of the radio communication apparatus 100 pertaining to this embodiment will be hereinafter described. In the radio communication apparatus pertaining to this embodiment, the signal saturation effect attributable to the coupling loop interference signal to which the analog domain interference canceller 111 and received RF signal processor 114 are subjected can be reduced by attenuation of the signal power by the power suppressor for coupling loop interference signal 103.

Figure 4:
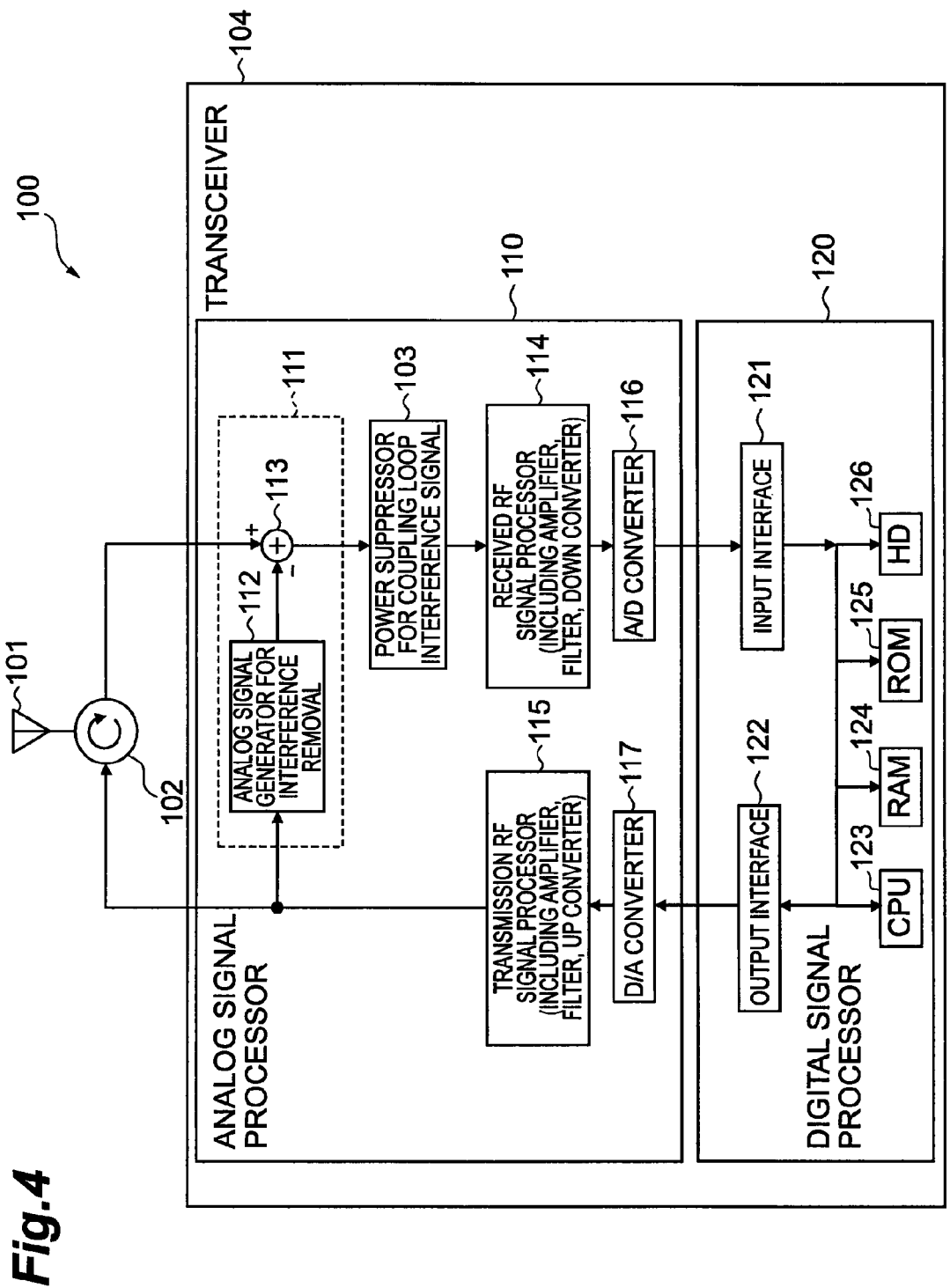
FIG. 4 is a diagram showing a first modification of the hardware block diagram of the radio communication apparatus pertaining to a first embodiment.

A modification of the configuration of the radio communication apparatus described above will be hereinafter described. While the example configuration of the radio communication apparatus described above describes a configuration in which, as shown in FIG. 1, the power suppressor for coupling loop interference signal 103 is provided between the circulator 102 and the interference canceller 111, as shown in FIG. 4, a configuration in which the power suppressor for coupling loop interference signal 103 is provided between the interference canceller 111 and the received RF signal processor 114 may be adopted. In this case, the signal saturation effect to which the received RF signal processor 114 and A/D converter 116 are subsequently subjected can be reduced by attenuation of the power of the signal from which the coupling loop interference signal has been removed by the interference canceller 111 by the power suppressor for coupling loop interference signal 103.

Figure 5:
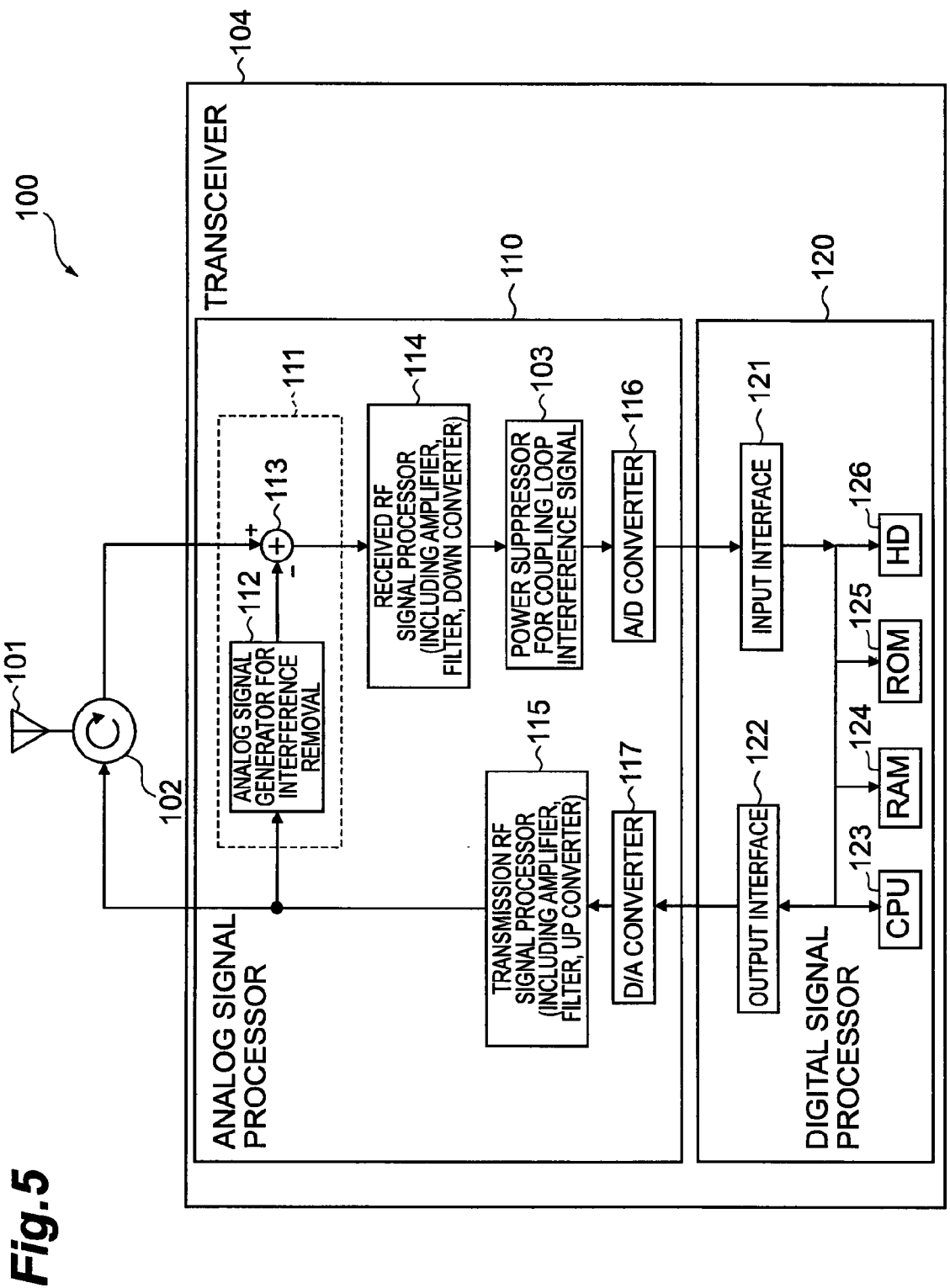
FIG. 5 is a diagram showing a second modification of the hardware block diagram of the radio communication apparatus pertaining to a first embodiment.

In addition, as shown in FIG. 5, a configuration in which the power suppressor for coupling loop interference signal 103 is provided between the received RF signal processor 114 and the A/D converter 116 can be adopted. In this case, the signal saturation effect to which the A/D converter 116 is subjected can be similarly reduced by attenuation of the signal power by the power suppressor for coupling loop interference signal 103. In the same way, the power suppressor for coupling loop interference signal 103 may be provided in an arbitrary position in the received RF signal processor 114.

As is described above, the signal saturation effect can be reduced by provision of the power suppressor for coupling loop interference signal 103 in the configuration of the radio communication apparatus 100 in any position between the circulator 102 and A/D converter 116.

Figure 6:
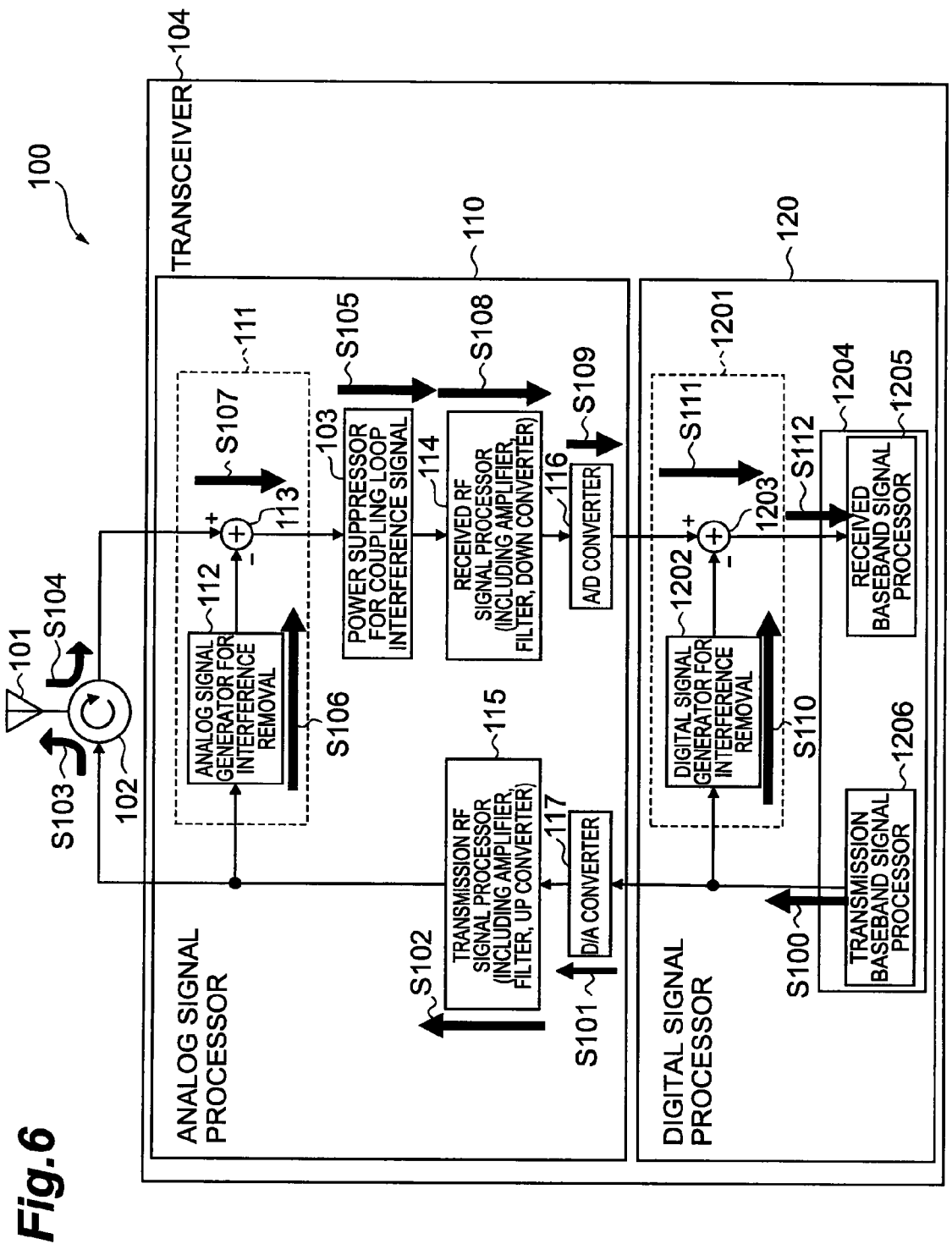
FIG. 6 is a diagram showing a first modification of the operation protocol of the radio communication apparatus pertaining to the first embodiment.

Furthermore, in the same way, while as shown in FIG. 3 the radio communication method transmission described above describes a method in which the signal power of the signal supplied to the coupling loop signal power suppressor 103 in step S104 is attenuated in step S105, as shown in FIG. 6, the signal power of the signal in which the analog domain interference removal has been performed in step S107 may be attenuated in step S105. As a result, the signal saturation effect can be reduced in step S108 and beyond.

Figure 7:
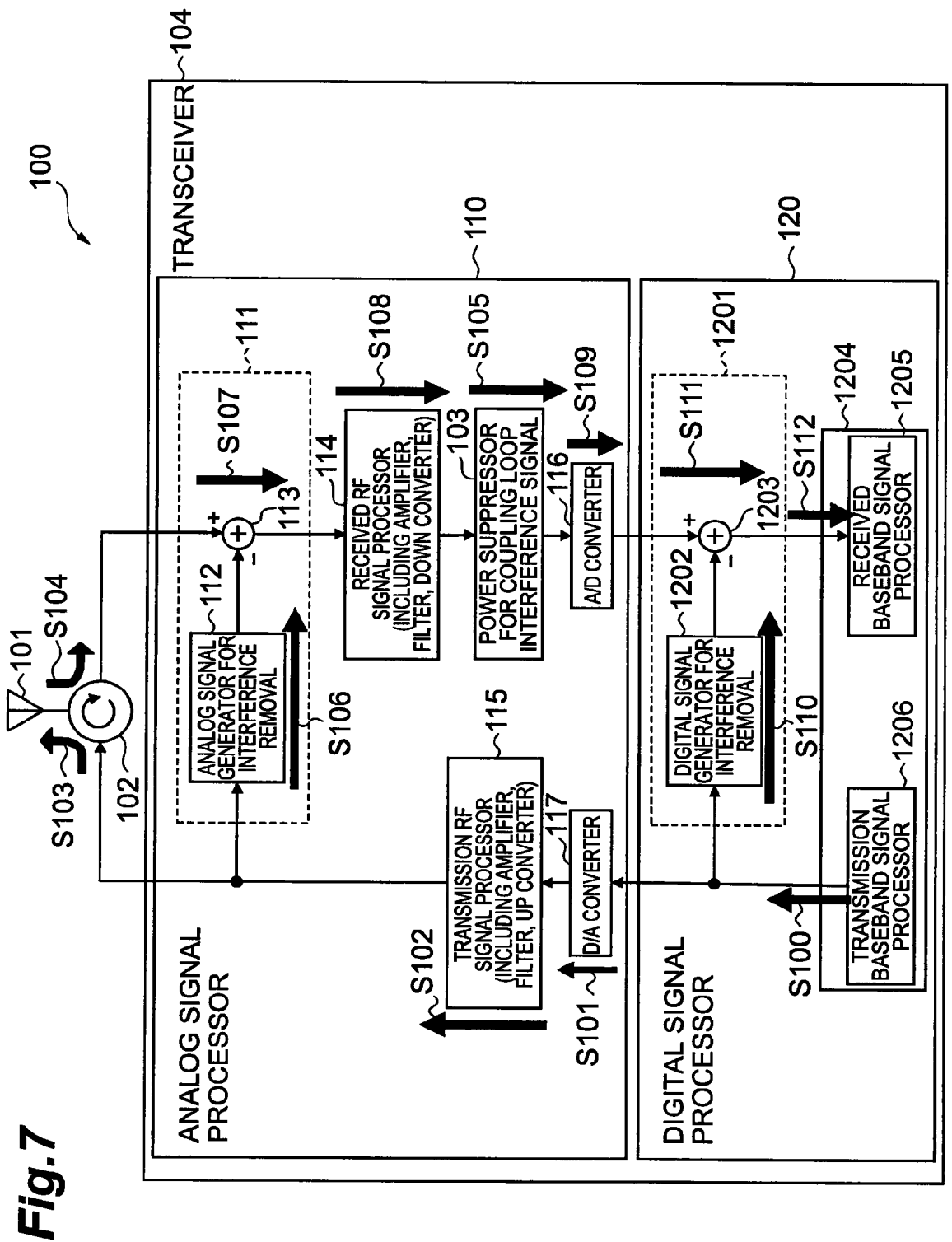
FIG. 7 is a diagram showing a second modification of the operation protocol of the radio communication apparatus pertaining to the first embodiment.

In addition, as shown in FIG. 7, the signal power of the signal on which the received RF signal processing has been performed in step S108 may be attenuated in step S105. As a result, the signal saturation effect with respect to A/D conversion (step S109) can be reduced. In the same way, the attenuation processing of the signal power of step S105 may be performed at any stage of the received RF signal processing of step S108.

As is described above, the signal saturation effect can be reduced by this radio communication method by executing the signal power attenuation processing of step S105 anywhere between step S104 and step S109.

Second Embodiment

Figure 8:
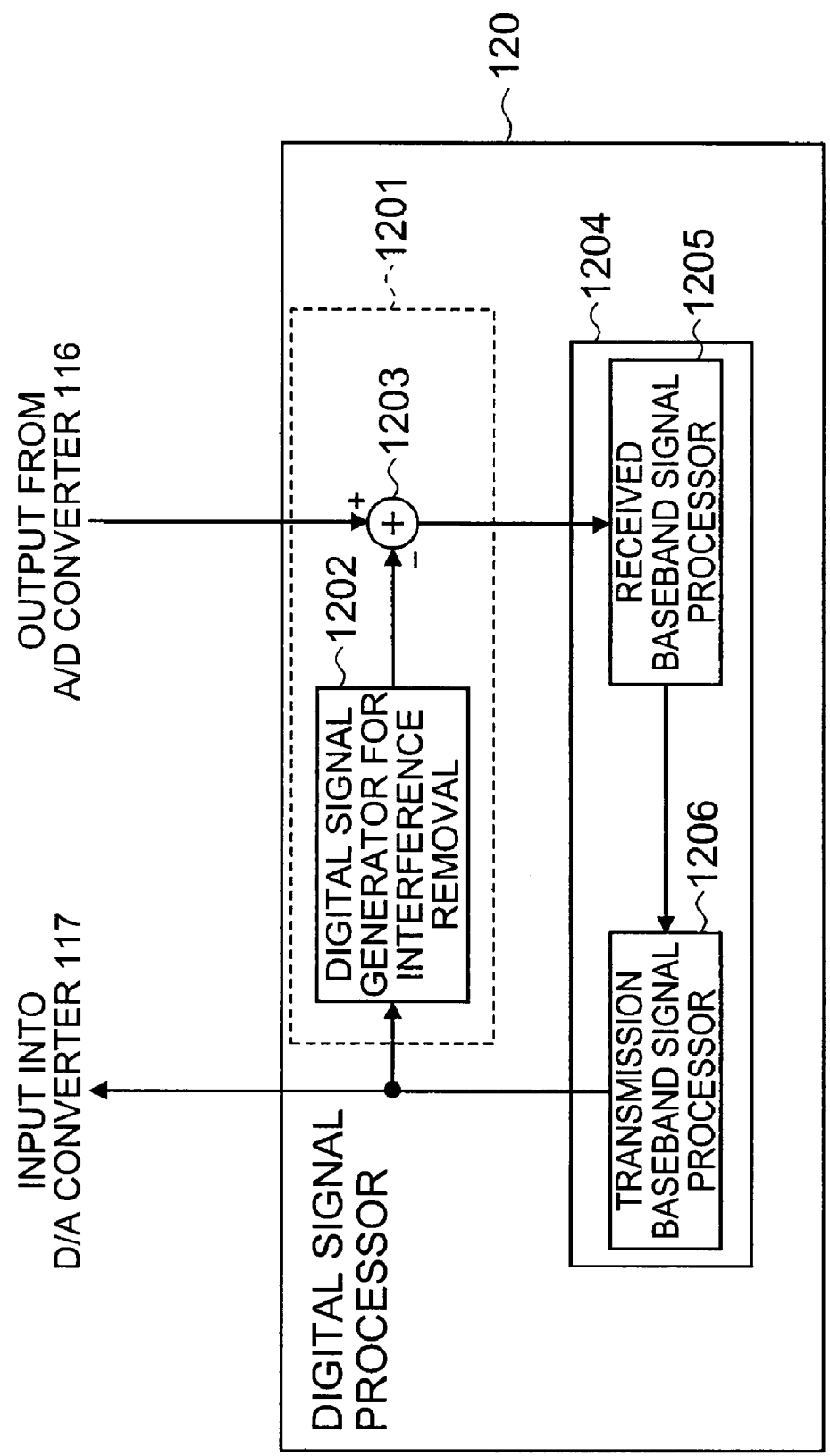
FIG. 8 is a function block diagram of a digital signal processor pertaining to a second embodiment.

The configuration of a second embodiment of a radio communication apparatus pertaining to the present invention will be hereinafter described. While the configuration of the radio communication apparatus of this embodiment is identical to the configuration of the radio communication apparatus shown in FIG. 1, the function block of the digital signal processor 120 of this embodiment is different from that of the first embodiment. FIG. 8 shows a function block diagram of the digital signal processor 120 of this embodiment. In this embodiment, the baseband signal processor 1204 employs the output signal of the received baseband signal processor 1205 as the input signal of the transmission baseband signal processor 1206.

Figure 9:
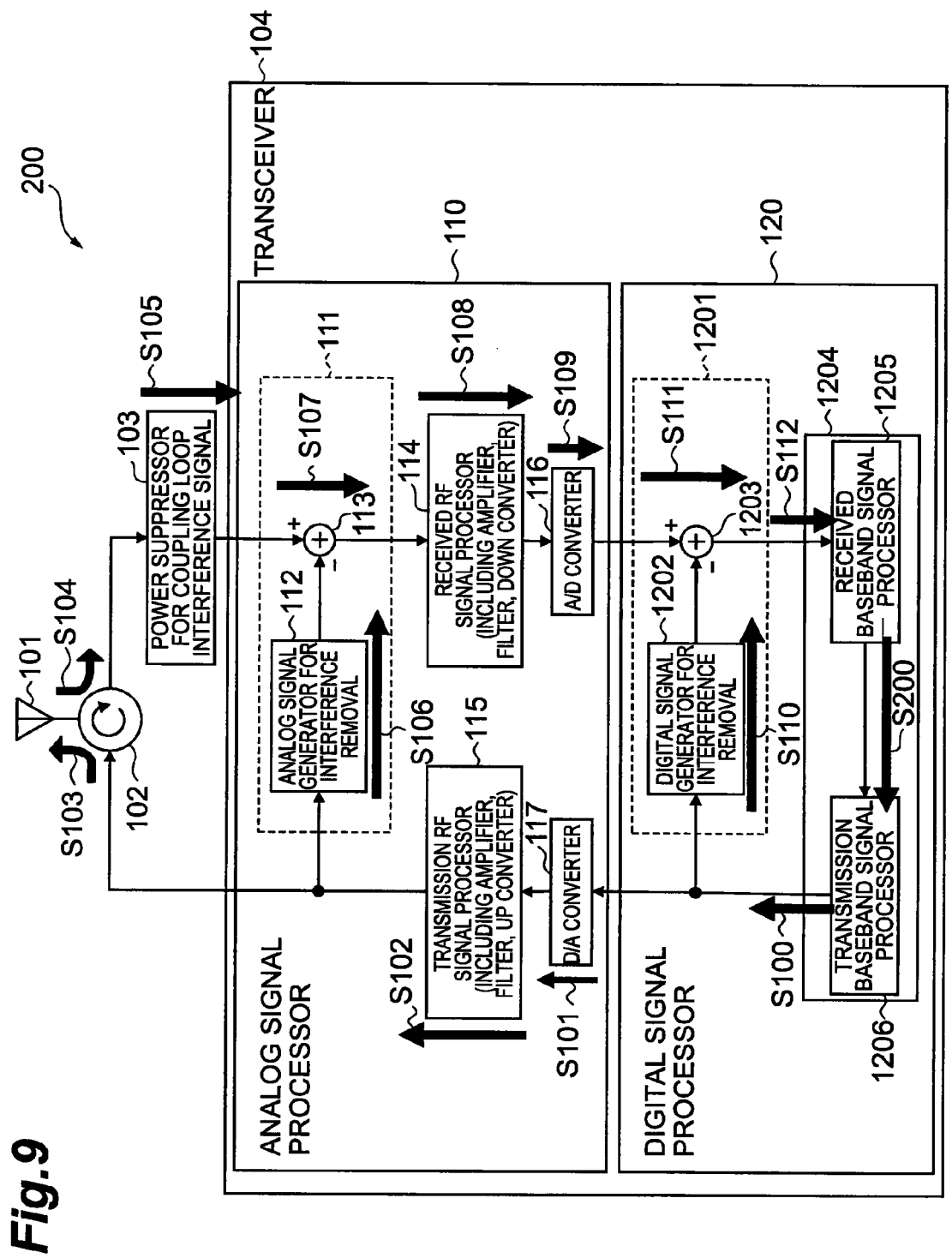
FIG. 9 is a diagram showing an operation protocol of a radio communication apparatus pertaining to the second embodiment.

The operation of the radio communication apparatus of the second embodiment will be described. FIG. 9 is a diagram showing an operation protocol of a radio communication apparatus pertaining to the second embodiment. As is described above, in step S200, the baseband signal processor 1204 employs the output signal of the received baseband signal processor 1205 as the input signal of the transmission baseband signal processor 1206. As a result, the radio communication apparatus 200 can be employed as a booster in a TDD system and, by attenuation of the signal by the power suppressor for coupling loop interference signal 103, the problems inherent to the employment of the radio communication apparatus 200 as a booster in a TDD system, that is to say, the signal saturation effect attributable to the coupling loop interference signal, can be reduced.

Third Embodiment

Figure 10:
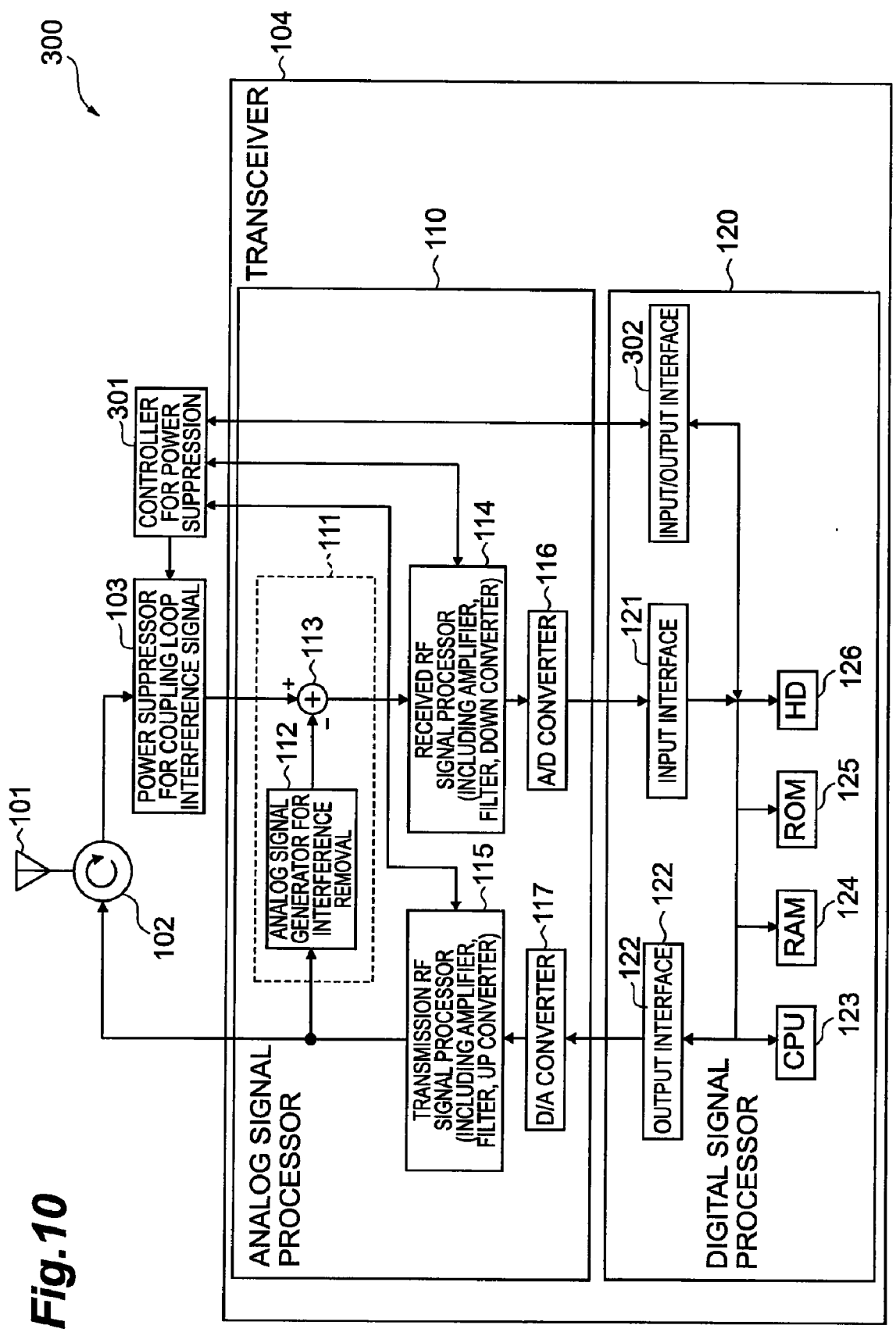
FIG. 10 is a hardware block diagram of a radio communication apparatus pertaining to a third embodiment.

The configuration of a third embodiment of a radio communication apparatus pertaining to the present invention will be hereinafter described. FIG. 10 is a hardware block diagram of a radio communication apparatus pertaining to a third embodiment. The radio communication apparatus 300 of this embodiment further includes a controller for power suppression 301 in the configuration of the radio communication apparatus 100 of the first embodiment shown in FIG. 1. The controller for power suppression 301 of this configuration performs the control of at least one of the signal attenuated amount by the power suppressor for coupling loop interference signal 103, the magnitude of the output signal of the received RF signal processor 114, the magnitude of the output signal of the transmission RF signal processor 115, and the magnitude of the output of the digital signal processor 120, in response to at least one of a current output of the received RF signal processor 114, a current output of the transmission RF signal processor 115, and a current output of the digital signal processor 120 via an input/output interface 302.

Figure 11:
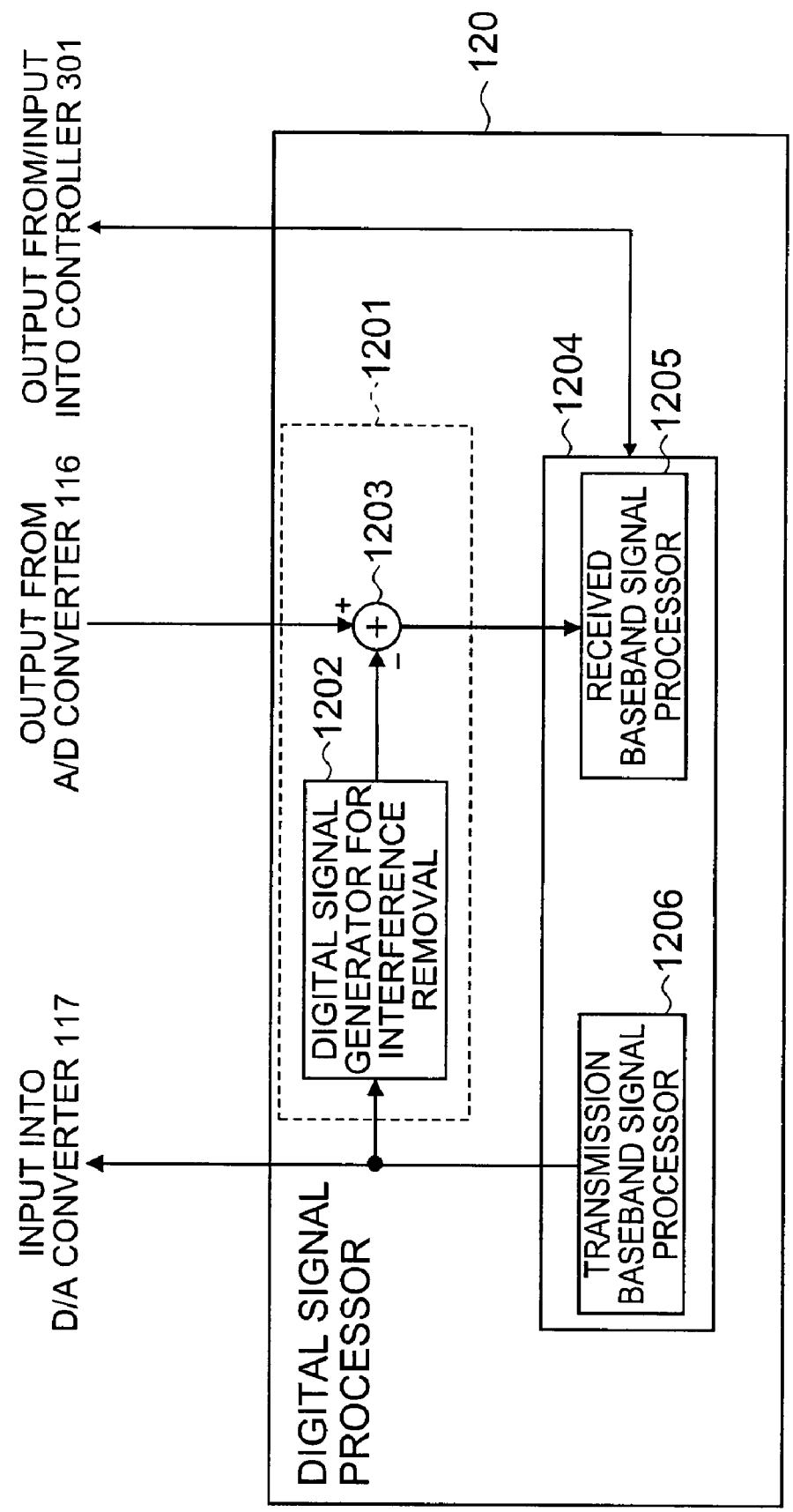
FIG. 11 is a function block diagram of a digital signal processor pertaining to the third embodiment.

FIG. 11 is a function block diagram of a digital signal processor 120 pertaining to this embodiment. While the configuration of the digital signal processor 120 is identical to that of the first embodiment, this embodiment is different from the first embodiment in the point that (1) the output of the baseband signal processor 1204 is input into the controller for power suppression 301, (2) the magnitude of the output on which the baseband signal processor 1204 has applied is decided by the controller for power suppression 301, and (3) the magnitude of the output of the transmission baseband signal processor 1206 is controlled by the baseband signal processor 1204 in accordance with this result.

Figure 12:
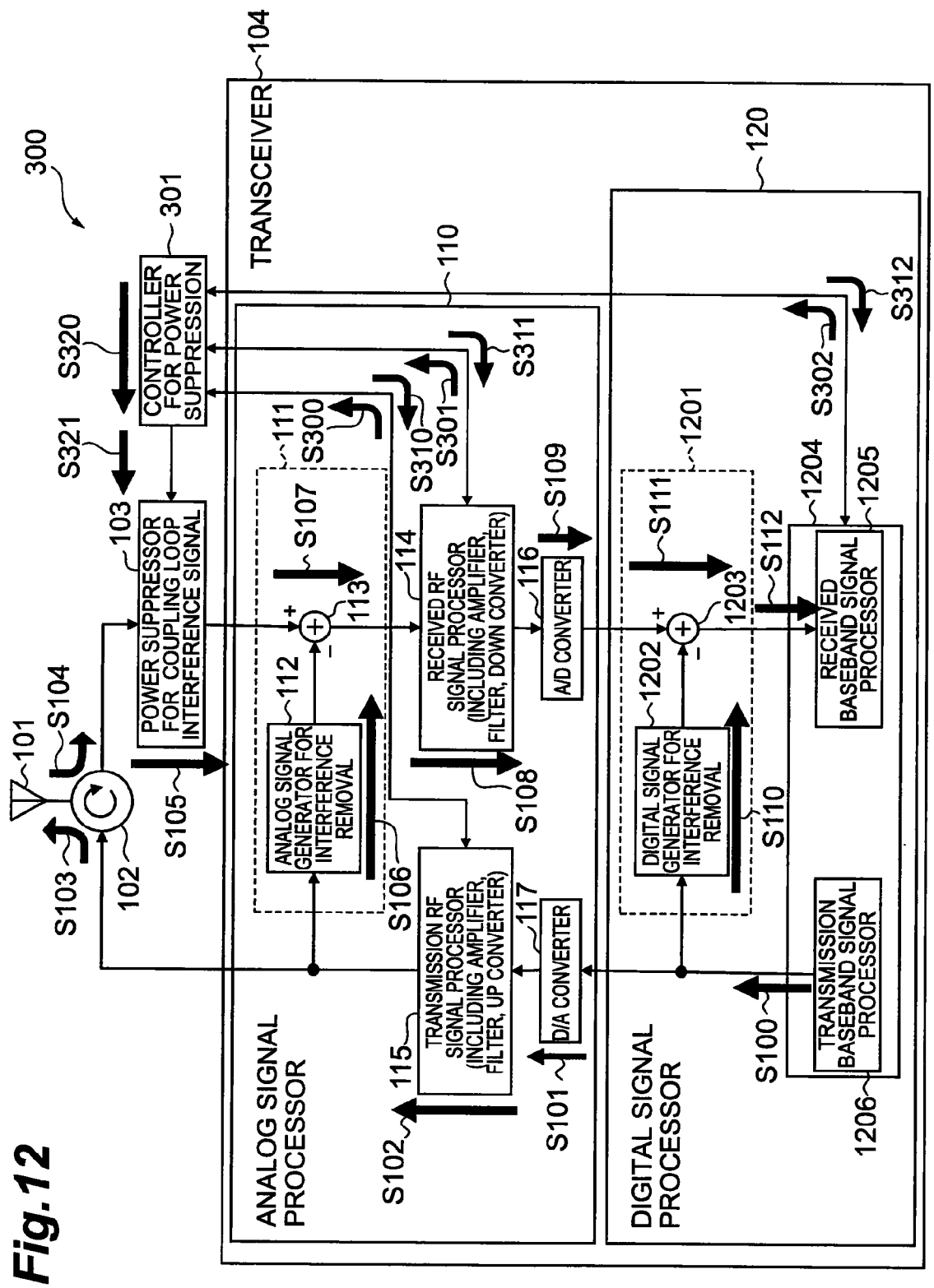
FIG. 12 is a diagram showing an operation protocol of the radio communication apparatus pertaining to the third embodiment.

The operation and radio communication method of the radio communication apparatus 300 pertaining to this embodiment will be described. FIG. 12 is a diagram showing an operation protocol of the radio communication apparatus 300 pertaining to this embodiment.

The method of radio communication transmission and reception pertaining to this embodiment is notable in that it includes, in addition to the protocol of the first embodiment shown in FIG. 3, the step S300 to S302, S310 to S312, S320 and S321.

First, in step S300, simultaneous with input of the magnitude of a current output signal of the transmission RF signal processor 115 into the controller for power suppression 301, in step S301, the magnitude of the current output signal of the received RF signal processor 114 is input into the controller for power suppression 301 and, in step S302, the magnitude of the output of the transmission baseband signal processor 1206 is input into the controller for power suppression 301 in the baseband signal processor 1204.

In step S320, in order to reduce the signal saturation effect, the controller for power suppression 301 determines the signal attenuation amount of the power suppressor for coupling loop interference signal 103, the magnitude of the output signal of the transmission RF signal processor 115, the magnitude of the output signal of the received RF signal processor 114, and the output magnitude of the baseband signal processor 1204. The controller for power suppression 301 notifies the power suppressor for coupling loop interference signal 103 (step S321) of the determined signal attenuation amount and, in addition, notifies each of the transmission RF signal processor 115, the received RF signal processor 114 and the baseband signal processor 1204 of the determined output magnitude (steps S310, S311 and S312). Following this, the power suppressor for coupling loop interference signal 103 employs these values to attenuate the signal and, in addition, each of the transmission RF signal processor 115, received RF signal processor 114 and baseband signal processor 1204 outputs a signal of the notified output magnitude.

While this describes an example in which, of the steps S300 to S302, all of the steps S300 to S302 are executed, only one of the steps S300 to S302 need necessarily be executed. In addition, while this similarly describes an example in which, of the steps S310 to S312 and S321, all the steps thereof are executed, only one of the step S310 to S312 and S321 need necessarily be executed.

Based on the above, because the magnitude of the output power is controllable in response to the permissible power which differs for each of the analog domain signal processors, the signal saturation effect can be further reduced.

Fourth Embodiment

Figure 13:
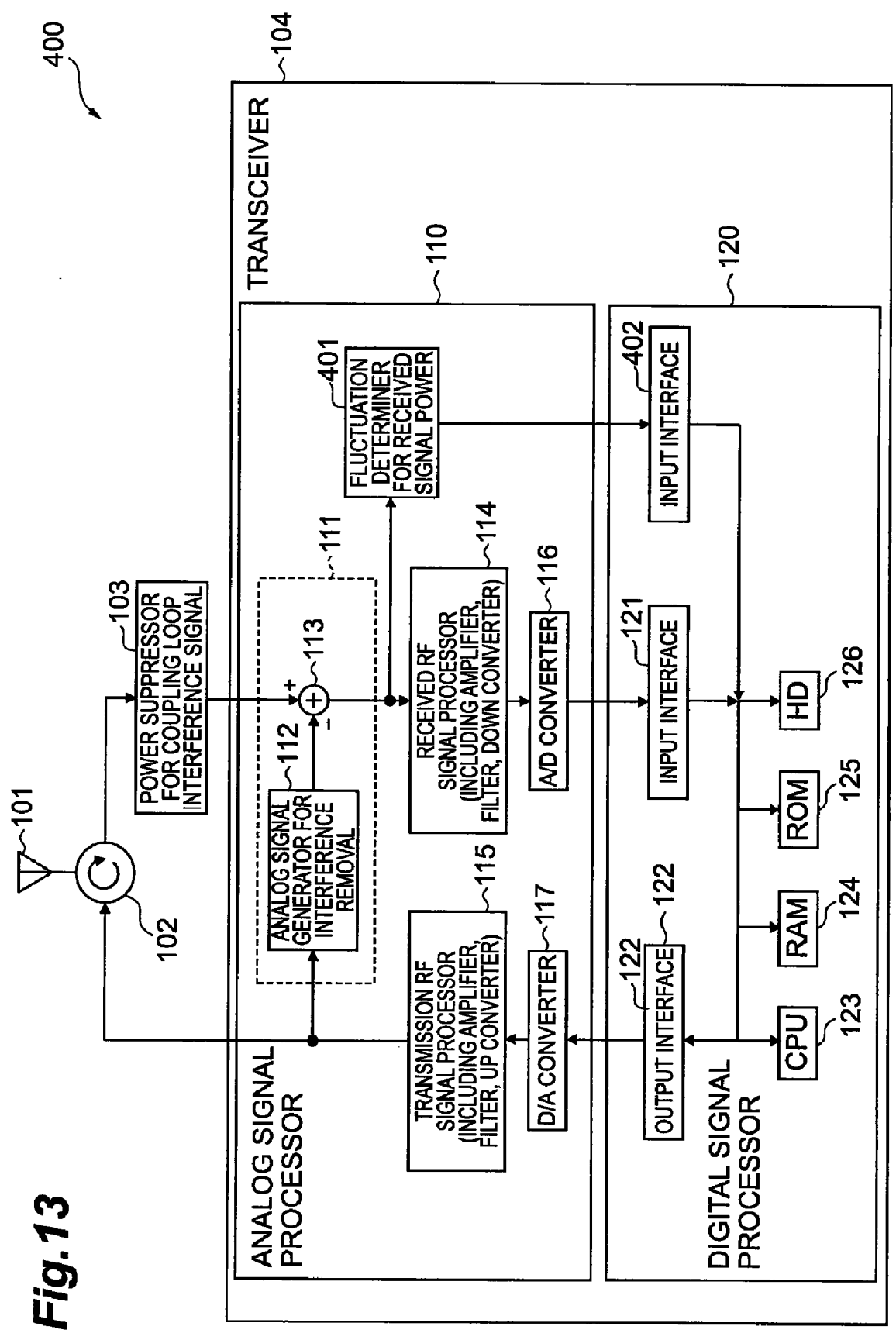
FIG. 13 is a hardware block diagram of a radio communication apparatus pertaining to a fourth embodiment.

The configuration of a fourth embodiment of a radio communication apparatus pertaining to the present invention will be hereinafter described. FIG. 13 is a hardware block diagram of a radio communication apparatus pertaining to this embodiment. The radio communication apparatus 400 of this embodiment further includes a fluctuation determiner for received signal power 401 in addition to the configuration of the radio communication apparatus 100 of the first embodiment shown in FIG. 1. The fluctuation determiner for received signal power 401 of this configuration has a function for determining speed fluctuation of the received signal power. Satisfactory interference removal characteristics cannot be produced when the received signal power fluctuation is fast and, accordingly, the object of this function is to stop signal transmission from the radio apparatus 400. The output of the fluctuation determiner for received signal power 401 is input into the digital signal processor 120 via an input interface 402, and the digital signal processor 120 determines signal transmission propriety.

Figure 14:
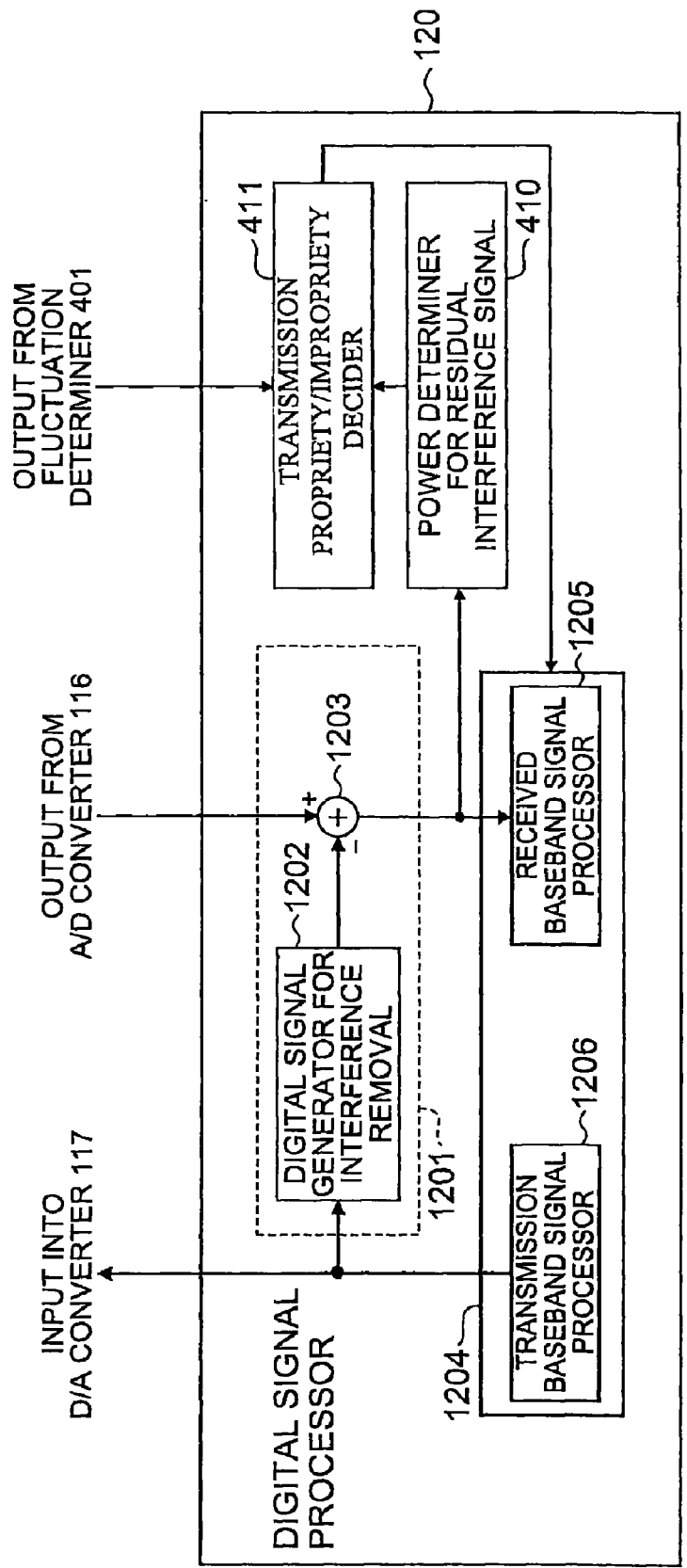
FIG. 14 is a function block diagram of a digital signal processor pertaining to the fourth embodiment.

FIG. 14 is a function block diagram of a digital signal processor pertaining to the fourth embodiment. The configuration of the digital signal processor 120 is further configured to include a power determiner for residual interference signal 410 and a transmission propriety/impropriety decider 411, in addition to the function block of the first embodiment shown in FIG. 2. The power determiner for residual interference signal 410 determines the power ratio (i.e. ratio of power) of the residual interference signal in the output signal after the interference removal for the digital domain. The power ratio of the residual interference signal in the output signal determined by the power determiner for residual interference signal 410 is input into the transmission propriety/impropriety decider 411. The transmission propriety/impropriety decider 411 determines whether or not signal transmission is to be performed by the transmission baseband signal processor 1206 in accordance with (1) whether or not the received signal power fluctuation speed determined by the fluctuation determiner for received signal power 401 is equal to or greater than a predetermined standard value and (2) whether or not the power ratio of the output of the residual interference signal determined by the power determiner for residual interference signal 410 is equal to or greater than a predetermined standard value. And the determination of which is input into the baseband signal processor 1204.

Figure 15:
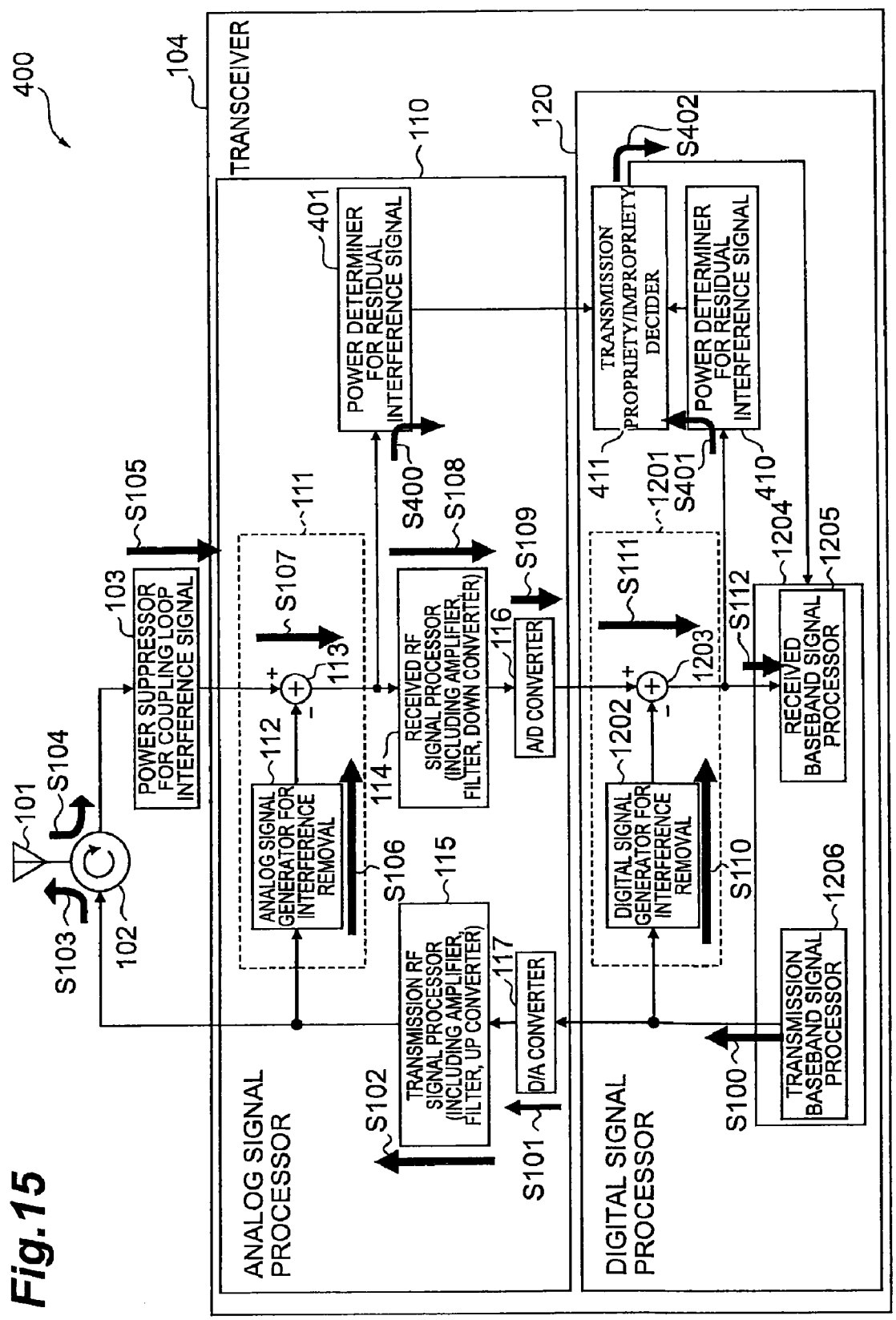
FIG. 15 is a diagram showing an operation protocol of the radio communication apparatus pertaining to the fourth embodiment.

The operation and radio communication method of the radio communication apparatus 400 pertaining to this embodiment will be described. FIG. 15 is a diagram showing an operation protocol of the radio communication apparatus pertaining to this embodiment.

The protocol pertaining to this embodiment further includes steps S400 to S402 in addition to the protocol of FIG. 3 shown for the first embodiment. In step S400, the fluctuation speed of the received signal power is determined employing the signal on which the analog domain interference removal of S107 has been performed. The signal prior to analog domain interference removal may be employed or a signal at any stage of the processing in the received RF signal processor 114 may be employed in determining the fluctuation speed of the received signal power of step S400.

Next, in step S401, the power determiner for residual interference signal 410 determines the power of the residual interference signal from the output signal on which digital domain interference removal has been performed, and determines the output ratio of the residual interference signal in the output signal on which the digital domain interference removal has been performed.

In step S402, the transmission propriety/impropriety decider 411 judges whether or not the received signal power fluctuation speed determined in step S400 is equal to or greater than a predetermined standard value and in addition, judges whether or not the output ratio of the residual interference determined in S401 is equal to or greater than a predetermined standard value. Thereupon, if the transmission propriety/impropriety decider 411 determines that the received signal power fluctuation speed is equal to or greater than a predetermined standard value or the transmission propriety/impropriety decider 411 determines that the output ratio of the residual interference signal is equal to or greater than a than a predetermined standard value, transmission from the transmission baseband signal processor 1206 is determined as improper, and if the received signal power fluctuation speed is determined as being less than the predetermined standard value and the output ratio of the residual interference signal is less than the predetermined standard value, transmission from the transmission baseband signal processor 1206 is determined as being possible. The transmission propriety/impropriety decider 411 outputs the determined result to the baseband signal processor 1204.

Based on the implementation of the operation described above, a control can be performed when the received signal power fluctuation speed is a predetermined standard value or higher and the power ratio of the residual interference signal is a predetermined standard value or higher to stop transmission from the radio communication apparatus 400. As a result, the signal saturation effect can be reduced and the desired signal detected characteristics of the received baseband signal processor 1205 can be improved.

The disclosure of Japanese Patent Application No. 2006-098202 filed Mar. 31, 2006 including specification, drawings and claims is incorporated herein by reference in its entirety.

What is claimed is:

1. A radio communication apparatus for performing transmission and reception based on radio communication, comprising:
 a power suppressor that attenuates signal power of a received signal in order to suppress a coupling loop interference signal power of the received signal;
 a transceiver having a coupling loop interference signal removal function for the analog domain and/or a coupling loop interference signal removal function for the digital domain, for removing a coupling loop interference signal contained in a signal output from the power suppressor, the transceiver comprising an analog signal processor configured to remove, in the analog domain, the coupling loop interference signal contained in the signal output from the power suppressor;
 a baseband signal processor having a transmission baseband signal processor and a received baseband signal processor, wherein the baseband signal processor is configured so that output from the received baseband signal processor is input into the transmission baseband signal processor;
 a fluctuation determiner that determines a received signal power fluctuation speed by employing an output signal on which interference removal for analog domain has been performed by the transceiver;
 a power determiner that determines a ratio of residual interference signal power in the output signal power on which interference removal for the digital domain has been performed by the transceiver; and
 a transmission propriety/impropriety decider that determines the propriety of transmission from the transmission baseband signal processor in accordance with at least one of whether or not the received signal power fluctuation speed determined by the fluctuation determiner is equal to or greater than a predetermined standard value and whether or not the ratio of residual interference signal power determined by the power determiner is equal to or greater than a predetermined standard value,
 wherein the transmission baseband signal processor is configured to perform an execution/stoppage control of the signal transmission in response to the transmission propriety result decided by the transmission propriety/impropriety decider.

2. A radio communication apparatus for performing transmission and reception based on radio communication, comprising:
 a power suppressor that attenuates signal power of a received signal in order to suppress a coupling loop interference signal power of the received signal;
 a transceiver having a coupling loop interference signal removal function for the analog domain and/or a coupling loop interference signal removal function for the digital domain, for removing a coupling loop interference signal contained in a signal output from the power suppressor, the transceiver comprising a baseband signal processor having a transmission baseband signal processor and a received baseband signal processor, and the baseband signal processor is configured so that output from the received baseband signal processor is input into the transmission baseband signal processor;
 a fluctuation determiner that determines a received signal power fluctuation speed by employing an output signal on which interference removal for analog domain has been performed by the transceiver;
 a power determiner that determines a ratio of residual interference signal power in the output signal power on which interference removal for the digital domain has been performed by the transceiver; and
 a transmission propriety/impropriety decider that determines the propriety of transmission from the transmission baseband signal processor in accordance with at least one of whether or not the received signal power fluctuation speed determined by the fluctuation determiner is equal to or greater than a predetermined standard value and whether or not the ratio of residual interference signal power determined by the power determiner is equal to or greater than a predetermined standard value, and
 wherein the transmission baseband signal processor is configured to perform an execution/stoppage control of the signal transmission in response to the transmission propriety result decided by the transmission propriety/impropriety decider.

* * * * *